United States Patent
Kannan et al.

(10) Patent No.: US 9,347,810 B2
(45) Date of Patent: May 24, 2016

(54) METHOD AND APPARATUS FOR MEASURING A PULSATINGLY FLUCTUATING FLOW RATE

(71) Applicant: Japan Aerospace Exploration Agency, Tokyo (JP)

(72) Inventors: Hiroki Kannan, Tsukuba (JP); Shusuke Hori, Tsukuba (JP); Hideaki Nanri, Tsukuba (JP); Masaharu Uchiumi, Tsukuba (JP); Yoshiki Yoshida, Tsukuba (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 23 days.

(21) Appl. No.: 14/323,836

(22) Filed: Jul. 3, 2014

(65) Prior Publication Data

US 2015/0013470 A1    Jan. 15, 2015

(30) Foreign Application Priority Data

Jul. 12, 2013  (JP) ................................ 2013-146813

(51) Int. Cl.
  *G01F 1/66* (2006.01)
  *G01F 1/72* (2006.01)
(52) U.S. Cl.
  CPC ... *G01F 1/72* (2013.01); *G01F 1/66* (2013.01)
(58) Field of Classification Search
  None
  See application file for complete search history.

(56) References Cited

U.S. PATENT DOCUMENTS 6,782,326 B2   8/2004 Takamoto et al.
6,796,189 B1 * 9/2004 Umekage .................. G01F 1/72
                                                        73/861.27

(Continued)

FOREIGN PATENT DOCUMENTS

EP    1243901 A1    9/2002
EP    1921424 A1    5/2008

(Continued)

OTHER PUBLICATIONS

Brennen et al., "Scale Effects in the Dynamic Transfer Functions for Cavitating Inducers," Journal of Fluids Engineering, vol. 104, pp. 428-433, Dec. 1982.

(Continued)

*Primary Examiner* — Harshad R Patel
(74) *Attorney, Agent, or Firm* — McDermott Will & Emery LLP

(57) ABSTRACT

A method and apparatus for measuring a pulsatingly fluctuating flow rate under a general condition, without needing electrical conductivity for a fluid, and without allowing a phase lag corresponding to a calculation time or attenuation, or resulting from a relation between pressure difference and flow rate, to occur. Ultrasonic waves are repeatedly transmitted with respect to a pulsatingly fluctuating fluid, while the ultrasonic wave is being received, and a signal indicative of the transmission and receipt, and a signal indicative of a timing of the transmission and receipt are recorded. Alternatively, the ultrasonic wave is transmitted and received based on a preliminarily set timing signal, and the signal indicative of the transmission and receipt is recorded. These signals are used to determine flow rates and transmission and receipt timings to plot a pulsating fluctuation. In one or more implementations, the timing signal may be phase-synchronized with a pulsation reference signal.

9 Claims, 9 Drawing Sheets

(56) References Cited

U.S. PATENT DOCUMENTS

| | | | |
|---|---|---|---|
| 2001/0010031 A1 | 7/2001 | Takamoto et al. | |
| 2004/0261539 A1* | 12/2004 | Umekage | G01F 1/66 73/861.27 |
| 2004/0267464 A1* | 12/2004 | Umekage | G01F 1/66 702/48 |
| 2005/0000301 A1* | 1/2005 | Umekage | G01F 1/66 73/861.27 |

FOREIGN PATENT DOCUMENTS

| | | |
|---|---|---|
| EP | 2375223 A1 | 10/2011 |
| JP | 2001-208584 A | 8/2001 |

OTHER PUBLICATIONS

Shimura et al., "Dynamic Response of the LE-5 Rocket Engine Liquid Oxygen Pump," Journal of Spacecraft and Rockets, vol. 22, No. 2, pp. 195-200, Mar.-Apr. 1985.

Shimura, T., "Geometry Effects in the Dynamic Response of Cavitating LE-7 Liquid Oxygen Pump," Journal of Propulsion and Power, vol. 11, No. 2, pp. 330-336, Mar.-Apr. 1995.

Hori, S., "Advanced Stability Analysis of Propulsion System for Future Launch Vehicles," Proceedings of Asian Joint Conference on Propulsion and Power, pp. 1-5, 2010.

Hori et al., "Dynamic Response to Global Oscillation of Propulsion Systems with Cavitating Pumps," Journal of Spacecraft and Rockets, vol. 48, No. 4, pp. 599-608, Jul.-Aug. 2011.

* cited by examiner (Conventional)
FIG.2
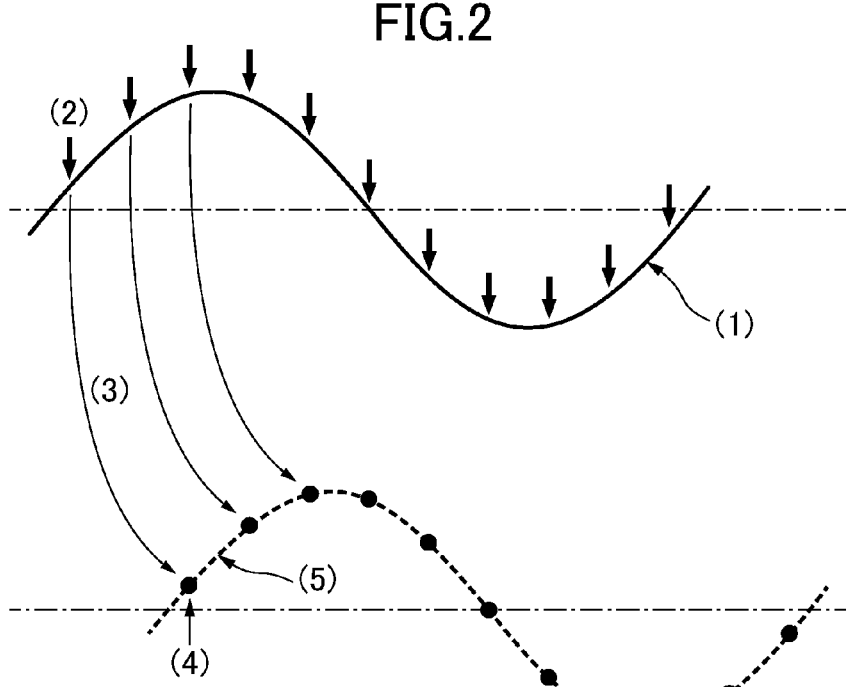
(Conventional)

METHOD AND APPARATUS FOR MEASURING A PULSATINGLY FLUCTUATING FLOW RATE

CROSS-REFERENCE TO RELATED APPLICATION

This application claims the benefit of priority from Japanese Patent Application No. 2013-146813 filed in the Japanese Patent Office on Jul. 12, 2013, the entire contents of which are incorporated herein by reference.

TECHNICAL FIELD

The present invention relates to a method and an apparatus for measuring a pulsatingly fluctuating flow rate in, for example, a ground testing of a propellant pump for a liquid rocket engine.

BACKGROUND ART

As a flow rate measurement method, various methods have already been proposed. However, in a conventional flow rate measurement method, there has been a problem that attenuation or a phase lag often occurs due to the characteristic of the measurement method itself, so that the pulsatingly fluctuating flow rate cannot be measured except under a limited condition (FIG. 1). Some conventional flow rate measurement methods will be overviewed below.

The Non-Patent Document 1 discloses an example of measuring a pulsatingly fluctuating flow up to about 50 Hz using an electromagnetic type flow rate measurement apparatus. It is believed that the electromagnetic type exhibits lower attenuation or phase lag at a relatively low frequency because it does not have any mechanical moving part. However, applicability of this type is limited, due to its principle, to a fluid having electrical conductivity (typically, water).

The Non-Patent Documents 2 and 3 disclose an example of measuring a pulsatingly fluctuating flow of liquid nitrogen using an ultrasonic type flow rate measurement apparatus. The ultrasonic type is applicable to any fluid as long as the ultrasonic wave is propagated therethrough. Further, the ultrasonic type exhibits lower attenuation or phase lag in principle because it does not have any mechanical moving part. However, this type is required to perform a high-load calculation to convert the ultrasonic signal into a flow rate value, so that, when the calculation is sequentially performed to output a flow rate signal during measurement, a phase lag corresponding to the calculation time occurs. For example, as illustrated in FIG. 2, when an actual flow rate varies over time (the horizontal axis represents a time) as indicated by (1), a graph representing the time variation of the flow rate can be provided as indicated by (5) according to the processes of: transmitting an ultrasonic wave into the fluid at each timing separated by appropriate time intervals as indicated by (2), while receiving the ultrasonic wave propagated within the fluid; sequentially calculating the obtained ultrasonic signal to convert into flow rate values as indicated by (3); and recording the flow rate signal upon completion of the conversion as indicated by (4). However, the recorded flow rate signal includes a time lag corresponding to the calculation time. To reduce the time lag, it is required to employ a simple and low-load calculation method. However, such a calculation method has a problem that it is susceptible to a noise and is not necessarily capable of correctly achieve the conversion into the flow rate value.

The Non-Patent Documents 4 and 5 disclose an example of determining a flow rate from a pressure difference between two points in a flow passage. Generally, the pressure measurement exhibits lower attenuation or time lag as compared to the flow rate measurement. However, to determine the flow rate from the pressure difference, it is necessary to know flow passage resistance and fluid inertia, but it is difficult to measure these values directly. Thus, this method has a problem that a theoretical value etc. must be assumed.

The Patent Documents 1 and 2 disclose a technique of measuring a flow rate at one point at a time for each cycle of pulsating fluctuation by taking as an example intake and exhaust of an automobile engine.

LIST OF PRIOR ART DOCUMENTS

Patent Documents

Patent Document 1: US 2001/0010031A
Patent Document 2: JP 2001-208584A

Non-Patent Documents

Non-Patent Document 1: Brennen, C. E., Meissner, C., Lo, E. Y. and Holfman, G. S. "Scale Effects in the Dynamic Transfer Functions for Cavitating Inducers" Journal of Fluids Engineering, Vol. 104, pp. 428-433, 1982
Non-Patent Document 2: Shimura, T. and Kamijo, K. "Dynamic Response of the LE-5 Rocket Engine Liquid Oxygen Pump" Journal of Spacecraft and Rockets, Vol. 22, No. 2, pp. 195-200, 1985
Non-Patent Document 3: Shimura, T. "Geometry Effects in the Dynamic Response of Cavitating LE-7 Liquid Oxygen Pump" Journal of Propulsion and Power, Vol. 11, No. 2, pp. 330-336, 1995
Non-Patent Document 4: Hori, S. "Advanced Stability Analysis of Propulsion System for Future Launch Vehicles" Proceedings of Asian Joint Conference on Propulsion and Power, 2010
Non-Patent Document 5: Hori, S. and Brennen, C. E. "Dynamic Response to Global Oscillation of Propulsion Systems with Cavitating Pumps" Journal of Spacecraft and Rockets, Vol. 48, No. 4, pp. 599-608, 2011

SUMMARY OF THE INVENTION

Object to be Accomplished by the Invention

In view of the foregoing, it is an object of the present invention to provide a method and an apparatus capable of measuring a pulsatingly fluctuating flow rate under a general condition, without needing electrical conductivity for a fluid, without allowing a phase lag corresponding to a calculation time to occur, and without needing an assumption of flow passage resistance or fluid inertia.

Means to Accomplish the Object

To accomplish the above object, the present invention provides a flow rate measurement method, comprising repeating, a predetermined number of times, a step of transmitting an ultrasonic wave into a fluid pulsatingly flowing through a flow passage, receiving the ultrasonic wave, and recording an ultrasonic wave transmission and receipt-indicative signal indicative of the transmission and receipt of the ultrasonic wave; and a step of recording a timing signal indicative of a timing at which the transmission and receipt of the ultrasonic wave have been performed, whereafter the method further comprises: based on at least part of the recorded ultrasonic wave transmission and receipt-indicative signals, determining flow rates corresponding to the at least part of the ultrasonic wave transmission and receipt-indicative signals; based on at least part of the timing signals, determining ultrasonic wave transmission and receipt timings corresponding to the at least part of the timing signals; and based on the determined respective flow rates and the determined respective transmission and receipt timings, composing a pulsating fluctuation in flow rate of the fluid.

The present invention also provides a flow rate measurement method, comprising repeating, a predetermined number of times, a step of transmitting a timing signal at a predetermined timing; and a step of, in response to the transmitted timing signal, transmitting an ultrasonic wave into a fluid pulsatingly flowing through a flow passage, receiving the ultrasonic wave, and recording an ultrasonic wave transmission and receipt-indicative signal indicative of the transmission and receipt of the ultrasonic wave, whereafter the method further comprises: based on at least part of the recorded ultrasonic wave transmission and receipt-indicative signals, determining flow rates corresponding to the at least part of the ultrasonic wave transmission and receipt-indicative signals; based on at least part of the timing signals, determining ultrasonic wave transmission and receipt timings corresponding to the at least part of the timing signals; and based on the determined respective flow rates and the determined respective transmission and receipt timings, composing a pulsating fluctuation in flow rate of the fluid.

In this method, when the fluid is a fluid flowing through the flow passage while pulsatingly fluctuating based on a pulsation reference signal, the timing signal is preferably transmitted at a frequency multiplied by a rational number of a frequency of the pulsation reference signal.

The present invention further provides a flow rate measurement apparatus, comprising: an ultrasonic wave transmitting and receiving section for transmitting ultrasonic waves into a fluid pulsatingly flowing through a flow passage, and receiving the ultrasonic waves; an ultrasonic wave transmission and receipt signal recording section for recording ultrasonic wave transmission and receipt-indicative signals indicative of the transmissions and receipts of the ultrasonic waves; a timing signal recording section for recording timing signals indicative of timings at which the transmissions and receipts of the ultrasonic wave have been performed; a flow rate determining section for determining flow rates based on the ultrasonic wave transmission and receipt-indicative signals; an ultrasonic wave transmission and receipt timing determining section for determining ultrasonic wave transmission and receipt timings based on the timing signals; and a pulsating fluctuation composing section for composing a pulsating fluctuation of flow rate of the fluid based on the respective flow rates determined by the flow rate determining section and the respective transmission and receipt timings determined by the ultrasonic wave transmission and receipt timing determining section, wherein the transmission and receipt performed by the ultrasonic wave transmitting and receiving section, the recording of the ultrasonic wave transmission and receipt-indicative signal performed by the ultrasonic wave transmission and receipt signal recording section, and the recording of the timing signal performed by the timing signal recording section are repeated a predetermined number of times, and whereafter, the flow rate determining section is operable, based on at least part of the recorded ultrasonic wave transmission and receipt-indicative signals, to determine flow rates corresponding to the at least part of the ultrasonic wave transmission and receipt-indicative signals; the ultrasonic wave transmission and receipt timing determining section is operable, based on at least part of the recorded timing signals, to determine ultrasonic wave transmission and receipt timings corresponding to the at least part of the timing signals; and the pulsating fluctuation composing section is operable, based on the determined respective flow rates and the determined respective transmission and receipt timings, to compose a pulsating fluctuation of flow rate of the fluid.

The present invention also provides a flow rate measurement apparatus, comprising: a timing signal transmitting section for transmitting timing signals at a predetermined timing; an ultrasonic wave transmitting and receiving section for transmitting ultrasonic waves into a fluid pulsatingly flowing through a flow passage, and receiving the ultrasonic wave, in response to the transmitted timing signals; an ultrasonic wave transmission and receipt signal recording section for recording ultrasonic wave transmission and receipt-indicative signals indicative of the transmissions and receipts of the ultrasonic waves; a flow rate determining section for determining flow rates based on the ultrasonic wave transmission and receipt-indicative signals; an ultrasonic wave transmission and receipt timing determining section for determining ultrasonic wave transmission and receipt timings based on the timing signals; and a pulsating fluctuation composing section for composing a pulsating fluctuation of flow rate of the fluid based on the respective flow rates determined by the flow rate determining section and the respective transmission and receipt timings determined by the ultrasonic wave transmission and receipt timing determining section, wherein the transmission of the timing signal performed by the timing signal transmitting section, the transmission and receipt of the ultrasonic wave performed by the ultrasonic wave transmitting and receiving section in response to the transmitted timing signal, and the recording of the ultrasonic wave transmission and receipt-indicative signal performed by the ultrasonic wave transmission and receipt signal recording section are repeated a predetermined number of times, and whereafter, the flow rate determining section is operable, based on at least part of the recorded ultrasonic wave transmission and receipt-indicative signal, to determine flow rates corresponding to the at least part of the ultrasonic wave transmission and receipt-indicative signals; the ultrasonic wave transmission and receipt timing determining section is operable, based on at least part of the recorded timing signals, to determine ultrasonic wave transmission and receipt timings corresponding to the at least part of the timing signal; and the pulsating fluctuation composing section is operable, based on the determined respective flow rates and the determined respective transmission and receipt timings, to compose a pulsating fluctuation of flow rate of the fluid.

In this apparatus, when the fluid is a fluid flowing through the flow passage while pulsatingly fluctuating based on a pulsation reference signal, the timing signal transmitting section is preferably operable to transmit the timing signal at a frequency multiplied by a rational number of a frequency of the pulsation reference signal.

Effect of Invention

The flow rate measurement method and the flow rate measurement apparatus of the present invention employ an ultrasonic type which is applicable to any fluid as long as the ultrasonic wave is propagated. Further, the ultrasonic type exhibits lower attenuation or phase lag in principle because it does not require any mechanical moving part. In the present invention, the transmission and receipt timing of the ultrasonic wave can be determined independently of a flow rate value. This makes it possible to obtain a pulsating fluctuation without a phase lag regardless of a calculation load of the ultrasonic signal.

Further, when the timing signal is phase-synchronized at a frequency multiplied by a rational number of a frequency of the pulsation reference signal, it is possible to maintain a necessary and sufficient sampling rate even if the pulsation reference signal varies significantly. In this case, the discrete Fourier transform is allowed to be performed in the phase-synchronized interval having a length of the integral multiple of the wavelength of the pulsating fluctuation, so that it becomes possible to determine amplitude and a phase of the flow rate with a high degree of accuracy.

BRIEF DESCRIPTION OF THE DRAWINGS

FIG. 2 is a conceptual diagram for explaining the conventional flow rate measurement method in detail to explain an occurrence of the phase lag.

DESCRIPTION OF EMBODIMENTS

With reference to the drawings, specific examples of a flow rate measurement method and a flow rate measurement apparatus of the present invention will now be described. It is noted that the flow rate measurement method and the flow rate measurement apparatus of the present invention are not limited to the specific aspects described below, but are modifiable within a scope of the present invention. For example, in the embodiments below, a system (a propagation time difference system) is used in which two ultrasonic elements are installed in a flow passage line, and a flow rate is determined from a difference in propagation times of the ultrasonic wave in both directions between the ultrasonic elements. Alternatively, it is possible to use any system in which the ultrasonic wave is transmitted into a fluid and the flow rate is determined through a calculation based on a result thereof, such as a Pulse Doppler system suitable for opaque liquid. Further, circuits illustrated in FIGS. 6, 8 and 9 may be physically-isolated separate circuits, or a conceptual and functional section bearing each function in one circuit. Each processing performed to implement the present invention can be arbitrarily distributed to any one or more elements.

Principle of Flow Rate Measurement According to the Present Invention

Figure 1:
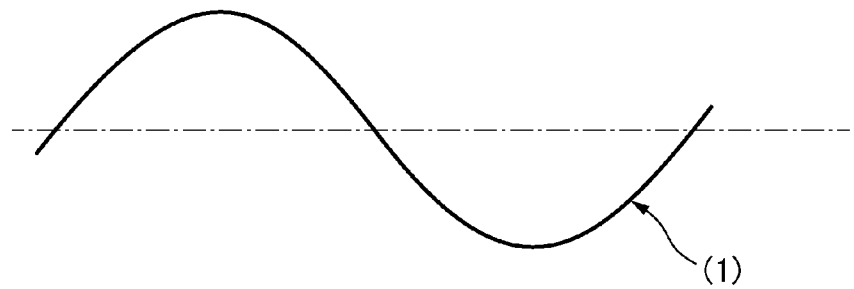
FIG. 1 is a conceptual diagram illustrating attenuation and a phase lag in a conventional flow rate measurement method, wherein (1) indicates an actual flow rate, and (2) indicates a measured flow rate.
Figure 3:
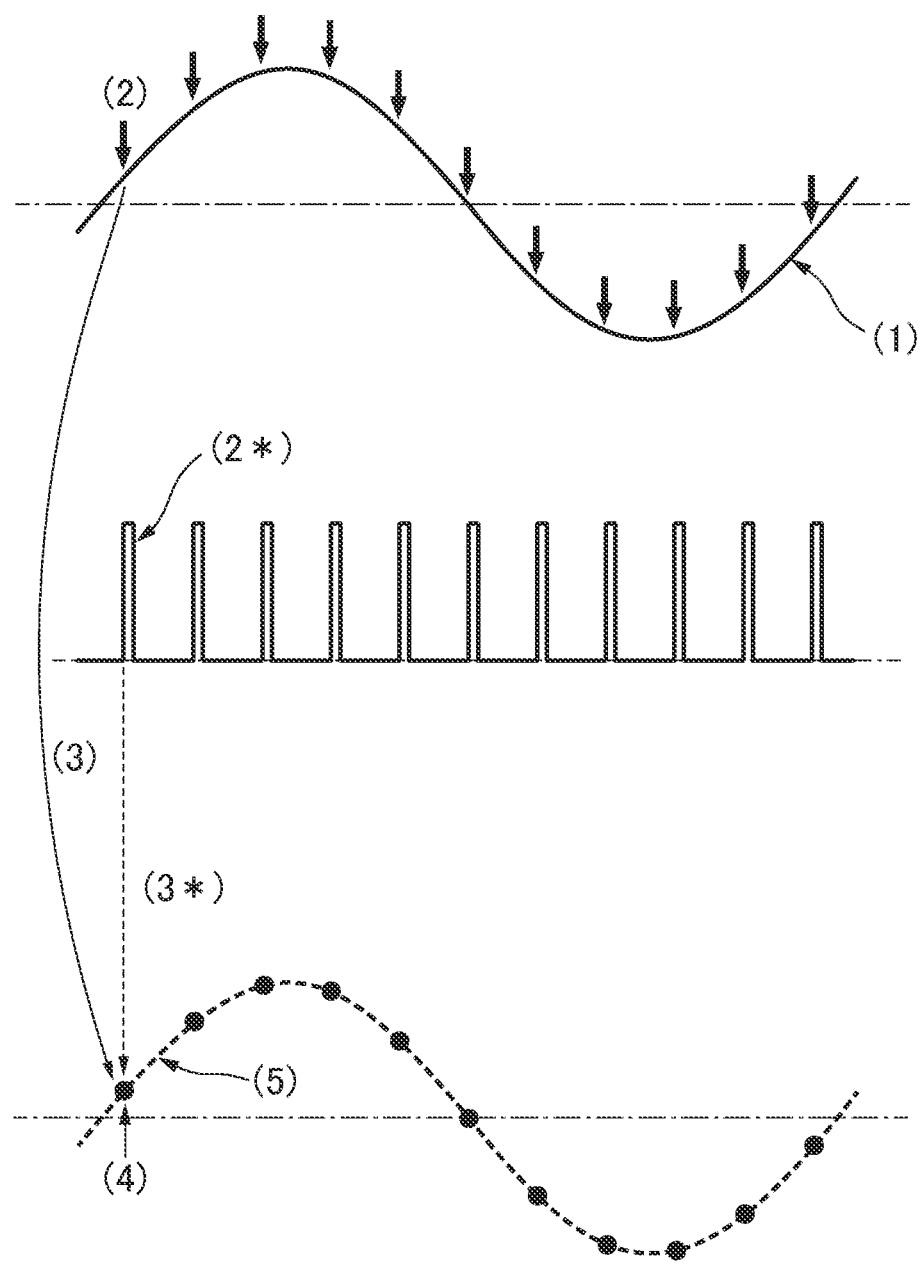
FIG. 3 is a conceptual diagram illustrating a general principle of a flow rate measurement method of the present invention.

Prior to describing specific examples, a principle of flow rate measurement according to the present invention will be described in detail by means of FIGS. 3 to 5. FIG. 3 illustrates a general principle of the flow rate measurement method of the present invention.

Firstly, a manner of recording a timing signal in response to transmission and receipt of an ultrasonic signal will be described. In FIG. 3, (1) is a graph showing an actual flow rate of a pulsating fluid (the horizontal axis represents a time). Ultrasonic waves are transmitted into the fluid at appropriate time intervals (which are not required to have an equal distance) as indicated by (2), and the ultrasonic waves propagated through the fluid are received. In the present invention, the obtained ultrasonic signals are not sequentially calculated to determine the flow rate. Rather, ultrasonic transmission and receipt-indicative signals (which may be any signal, such as a signal indicative of a waveform of the ultrasonic wave transmitted and received by each ultrasonic element, the transmission time and the receipt time at each ultrasonic element, or a signal indicative of a time taken for each transmission and receipt) are once recorded. At the same time, timing signals indicative of transmission and receipt timings of the ultrasonic wave as indicated by (2*) (which may be a signal such as a pulse waveform signal as illustrated in FIG. 3, or a signal indicative of a clock time at which each waveform pulse is generated) are further recorded.

The transmission and receipt of the ultrasonic wave, the recording of the ultrasonic transmission and receipt-indicative signal, and the recording of the timing signal are repeated a predetermined number of times. Then, as indicated by (3), the recorded ultrasonic wave transmission and receipt-indicative signals are calculated to be converted into momentary values of the flow rate. When the propagation time difference system is employed, the specific calculation may be a simple one according to the formula (1) as described below. Alternatively, it may be a calculation including a compensation based on a wide variety of factors such as a shape of the conduit, flow speed distribution, and others. The present invention is more advantageous particularly when the calculation is more complicated and requires more processing time because the invention can better prevent the phase lag over the prior art in such a situation. Further, as indicated by (3*), a transmission and receipt timing for each transmission and receipt of the ultrasonic wave is determined from the recorded timing signal. When the timing signal is recorded as a pulse waveform signal, the clock time at which the pulse reaches a peak may be determined as the transmission and receipt timing. Alternatively, when signals indicative of clock times at which respective waveform pulses are generated are recorded as timing signals, these clock times may be determined as the transmission and receipt timings. When a time difference occurs between the transmission and receipt of the ultrasonic wave and the generation of pulse waveform signal of (2*), an appropriate correction may be applied, e.g., a clock time that is earlier than the peak clock time of the pulse by a predetermined time may be determined as the "transmission and receipt timing".

Each of the recorded ultrasonic wave transmission and receipt-indicative signals is calculated to determine the flow rate, and the transmission and receipt timing for each transmission and receipt of the ultrasonic wave is determined from each of the recorded timing signals. In this process, it is not necessary to determine the flow rate and the transmission and receipt timing for all of the recorded ultrasonic wave transmission and receipt-indicative signals and the recorded timing signals, but the processing for part of the recorded signals may be skipped depending on, for example, the required measurement accuracy.

As indicated by (4), by associating the determined respective flow rates with the determined respective transmission and receipt timings, it becomes possible to compose a pulsating fluctuation of the flow rate. Heretofore, the flow rate is sequentially determined at each time when the transmission and receipt of the ultrasonic wave is performed, so that a graph obtained as a pulsating fluctuation of the flow rate represents a relationship between momentary values of the flow rate and "clock times at which the flow rate is determined". In contrast, in the present invention, the transmission and receipt timing is determined from the recorded timing signal and is associated with the flow rate, so that it becomes possible, as indicated by (5), to obtain a pulsating fluctuation without a phase lag regardless of a calculation load of the ultrasonic signal.

Next, a manner of transmitting and receiving the ultrasonic signal in response to the timing signal and recording the ultrasonic wave transmission and receipt-indicative signal will be described. In this manner, the timing signal indicated by (2*) in FIG. 3 is transmitted to, for example, an ultrasonic wave transmission and receipt circuit at a preliminarily set predetermined timing, and in response to the timing signal, the ultrasonic wave is transmitted into a fluid at each timing indicated by (2), and the ultrasonic wave propagated through the fluid is received. Also in this manner, the flow rate is not sequentially determined, but the ultrasonic wave transmission and receipt-indicative signal is recorded.

The transmission of the timing signal, the transmission and receipt of the ultrasonic wave, and the recording of the ultrasonic wave transmission and receipt-indicative signal are repeated a predetermined number of times. Then, as indicated by (3), the recorded ultrasonic wave transmission and receipt-indicative signals are calculated to be converted into momentary values of the flow rate. Further, as indicated by (3*), a transmission and receipt timing for each transmission and receipt of the ultrasonic wave is determined from the timing signal (which is assumed to be preliminarily recorded in, for example, a timing signal transmission circuit) transmitted at the above predetermined timing. As with the manner of recording the timing signal in response to the transmission and receipt of the ultrasonic signal, the processing for part of the various types of recorded signals may be skipped depending on, for example, the required measurement accuracy.

As indicated by (4), by associating the determined respective flow rates with the determined respective transmission and receipt timings, it becomes possible to compose a pulsating fluctuation of flow rate. As indicated by (5), a pulsating fluctuation without a phase lag can be obtained regardless of a calculation load of the ultrasonic signal.

In the manner of transmitting and receiving the ultrasonic signal in response to the timing signal and recording the ultrasonic wave transmission and receipt-indicative signal, particularly when the fluid is pulsatingly fluctuating based on a given pulsation reference signal, it is preferable for the timing signal to have a frequency obtained by multiplying a frequency of the pulsation reference signal by a rational number. This will be described by comparing the case where the timing signal does not have a frequency obtained by multiplying a frequency of the pulsation reference signal by a rational number with the case where the timing signal has such a frequency.

Figure 4:
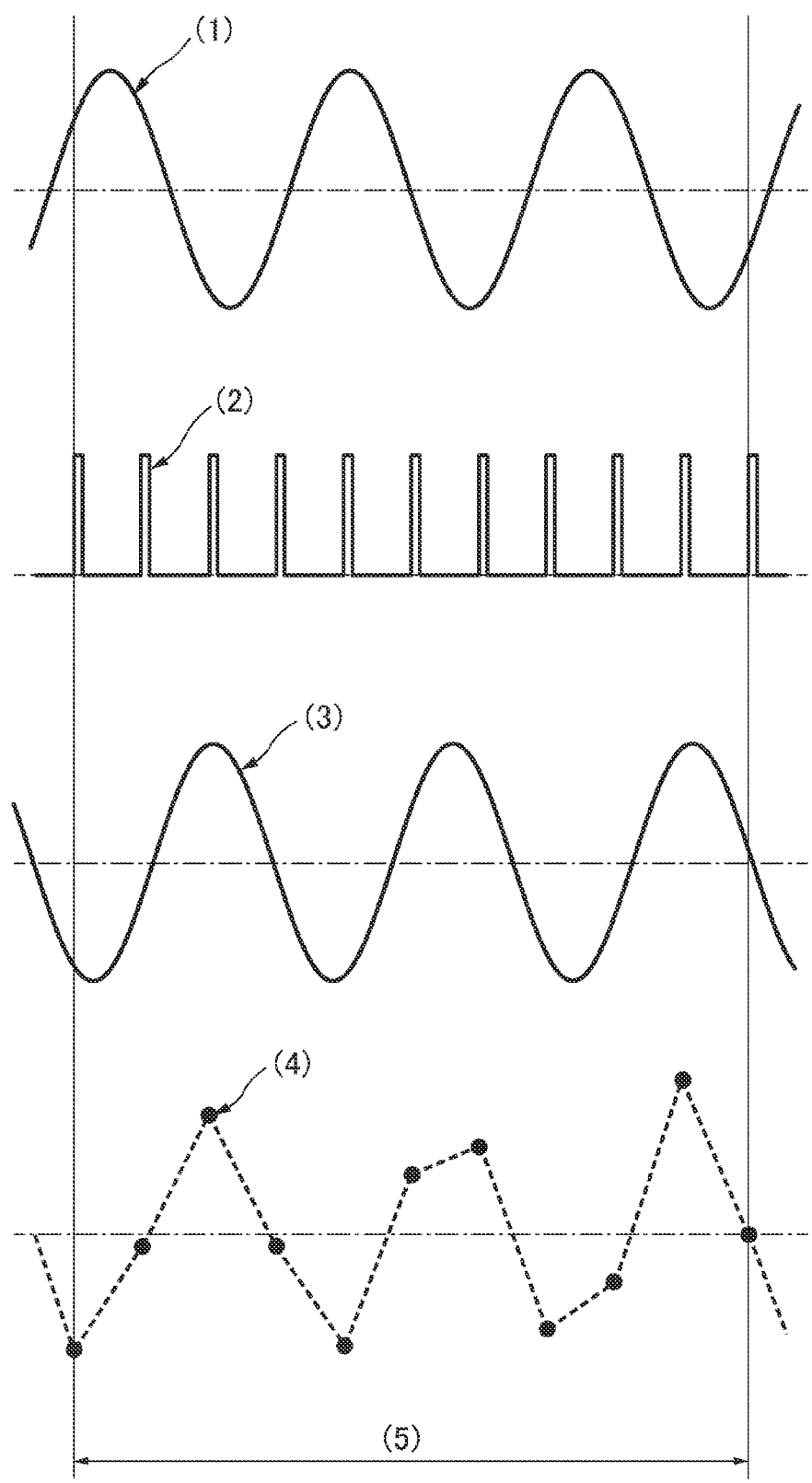
FIG. 4 is a conceptual diagram illustrating a flow rate measurement in which a pulsation reference signal and a timing signal are not phase-synchronized with each other, of the flow rate measurement method of the present invention.

FIG. 4 is a conceptual diagram illustrating a flow rate measurement in which a pulsation reference signal and a timing signal are not phase-synchronized with each other (one signal does not have a frequency obtained by multiplying the other by a rational number). Based on the pulsation reference signal indicated by (1), a pulsation source such as an actuator is driven to apply pulsation to the fluid. The flow rate in this situation is represented by (3). Typically, the actual pulsation is behind the pulsation reference signal due to a response time of the actuator, inertia of the fluid, and the like. The timing signals having regular intervals indicated by (2) are not phase-synchronized with the pulsation reference signal, so that the transmission and receipt timing of the ultrasonic wave does not become phase-synchronized with the pulsation. By determining the flow rates from the ultrasonic wave transmission and receipt-indicative signals, and by determining the transmission and receipt timings of the ultrasonic wave from the timing signals, pulsating fluctuation can be composed as indicated by (4). However, the discrete Fourier transform cannot necessarily be performed in an interval of the integral multiple of the pulsation cycle, so that it is impossible to exactly obtain amplitude and a phase of the flow rate with respect to the pulsation frequency.

Figure 5:
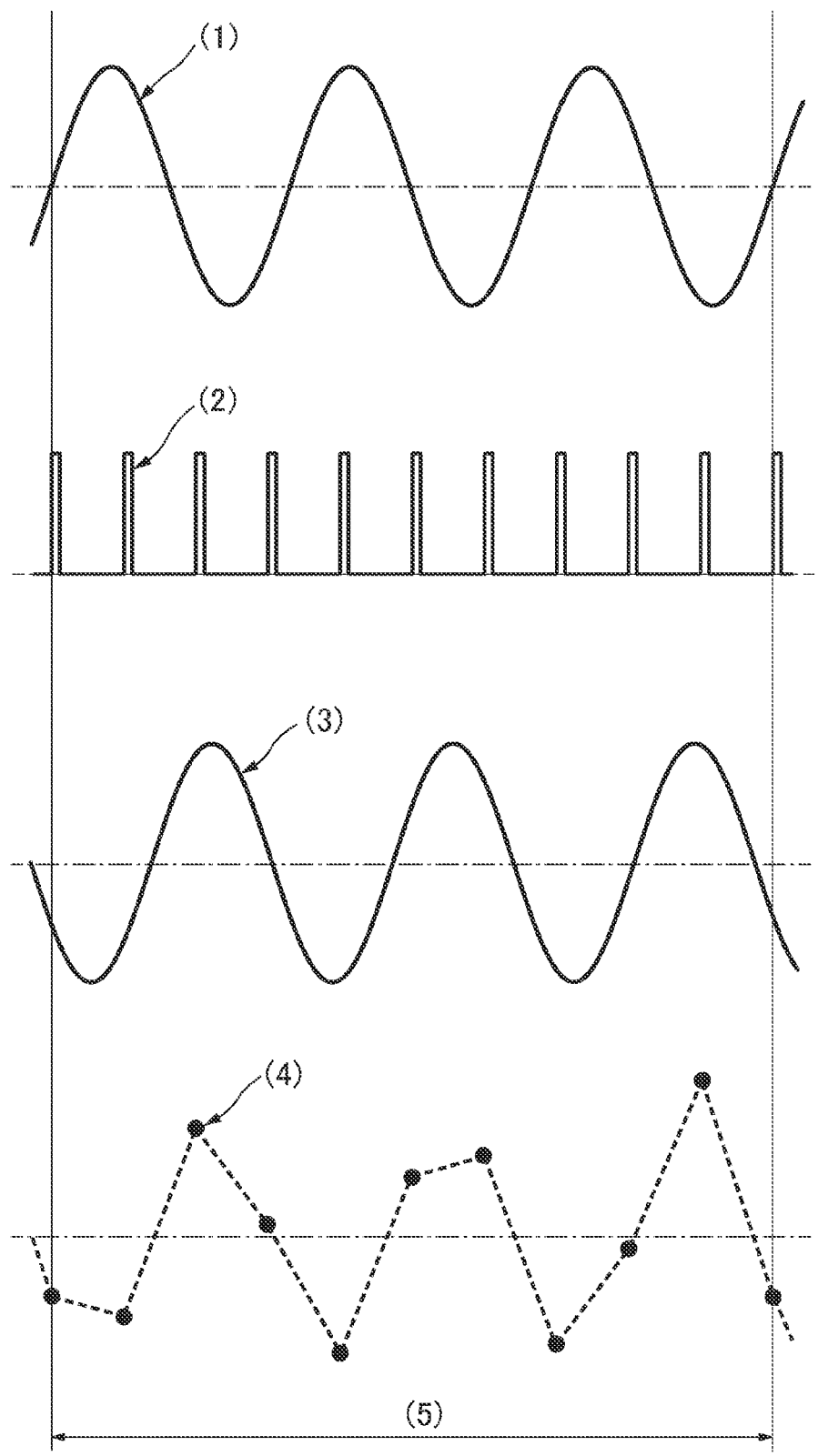
FIG. 5 is a conceptual diagram illustrating a flow rate measurement in which a pulsation reference signal and a timing signal are phase-synchronized with each other, of the flow rate measurement method of the present invention.

FIG. 5 is a conceptual diagram illustrating a flow rate measurement in which a pulsation reference signal and a timing signal are phase-synchronized with each other (one signal has a frequency obtained by multiplying the other by a rational number). As with the case of FIG. 4, a pulsation source such as an actuator is driven based on the pulsation reference signal indicated by (1) to apply pulsation to the fluid. The flow rate in this situation is represented by (3). The timing signals having regular intervals indicated by (2) are phase-synchronized with the pulsation reference signal, and in this example, three cycles of the pulsation reference signal correspond to ten cycles of the timing signal. By determining the flow rates from the ultrasonic wave transmission and receipt-indicative signals, and by determining the transmission and receipt timings of the ultrasonic wave from the timing signals, pulsating fluctuation can be composed as indicated by (4). Further, by applying the discrete Fourier transformation to the discrete flow rates indicated by (4) for the time period of just integral multiple of the pulsation cycle indicated by (5), it becomes possible to exactly obtain amplitude and phase of the flow rate with respect to the pulsation frequency with a high degree of accuracy. Specifically, given that N=10, the discrete Fourier coefficient $c_n$ for n=0, 1, ... N−1 can be obtained as follows:

$$c_n = \frac{1}{N} \sum_{j=0}^{N-1} f_j e^{-in\frac{2\pi}{T}t_j},$$

where T is a cycle over the time period of (5), $t_j$ (j=0, 1, . . . , 9) are respective transmission and receipt timings during the cycle (the 11th transmission timing is not required for the calculation), and $f_j$ is a flow rate value at $t_j$. This can be used to represent the flow rate f(t) depending on a clock time t as follows:

$$f(t) = \sum_{n=0}^{N-1} c_n e^{in\frac{2\pi}{T}t}$$

First Embodiment

Figure 6:
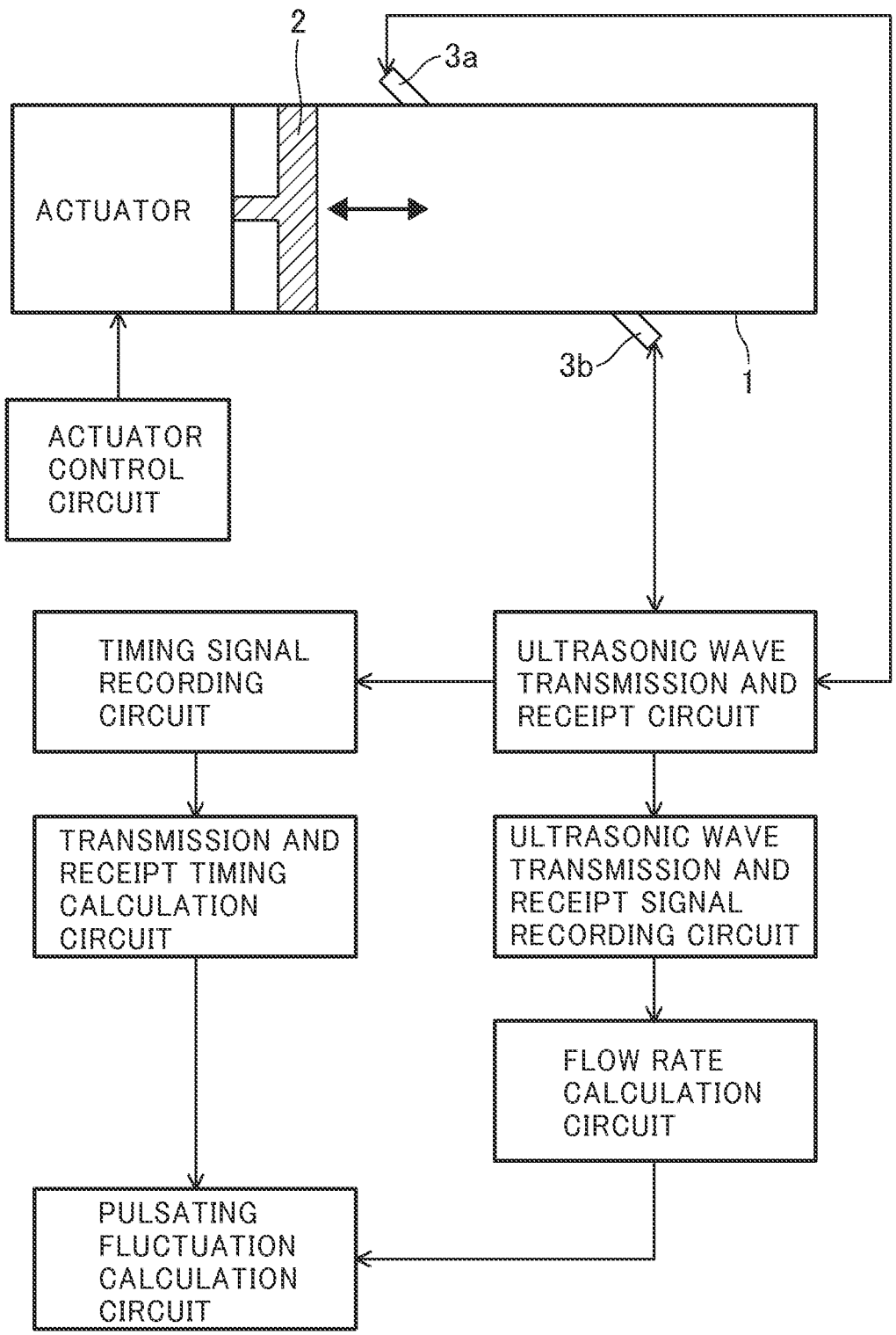
FIG. 6 is a structural diagram of a flow rate measurement apparatus according to one embodiment of the present invention, where the apparatus is connected to a flow passage.

Configuration of Flow Rate Measurement Apparatus According to the Present Invention As an example of the flow rate measurement apparatus according to the present invention, an apparatus for measuring the flow rate in a manner of recording the timing signal in response to transmission and receipt of the ultrasonic signal is illustrated in FIG. 6. In FIG. 6, the flow rate measurement apparatus comprises: ultrasonic elements 3a, 3b installed in a flow passage line 1 and an ultrasonic wave transmission and receipt circuit (which together constitute an ultrasonic wave transmitting and receiving section); an ultrasonic wave transmission and receipt signal recording circuit; a timing signal recording circuit; a flow rate calculation circuit; a transmission and receipt timing calculation circuit; and a pulsating fluctuation calculation circuit. An actuator is connected to the flow passage line 1, where the actuator causes a piston 2 to perform, for example, a cyclic movement based on a pulsation reference signal transmitted from an actuator control circuit, whereby pulsation is applied to the fluid within the flow passage line 1.

Figure 7:
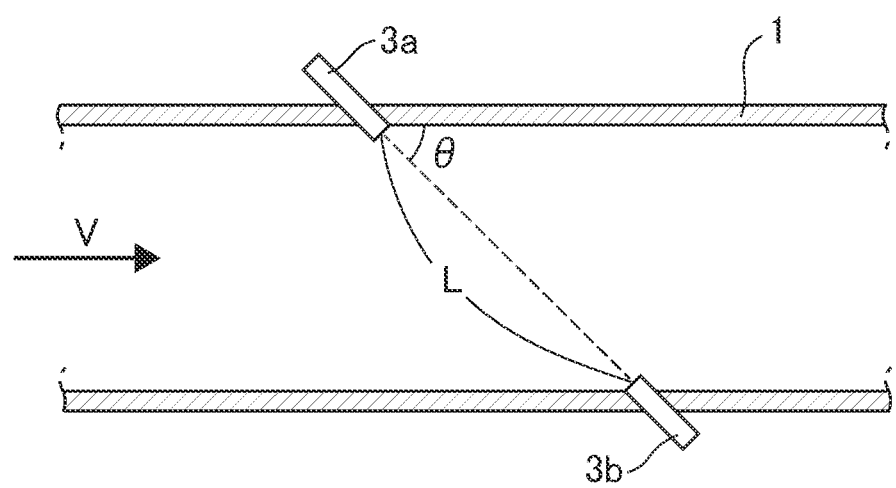
FIG. 7 is a diagram for explaining a principle of a manner of determining a flow rate from a difference in a propagation time when an ultrasonic wave is bi-directionally transmitted and received between two ultrasonic elements, as one example of a manner of determining a flow rate by means of transmission and receipt of an ultrasonic wave.

As illustrated in FIG. 7, the ultrasonic elements 3a, 3b form a pair of ultrasonic elements arranged in opposed relation to each other across the flow passage while being inclined at an angle θ. One ultrasonic element transmits an ultrasonic wave into the fluid flowing through the flow passage, and the other ultrasonic element receives the ultrasonic wave propagated through the fluid. In one simple example, as described in the Patent Document 2, given that $t_1$ is a propagation time until the ultrasonic wave passes through the passage having a length L and reaches the ultrasonic element 3b when the ultrasonic wave is transmitted from the ultrasonic element 3a to the ultrasonic element 3b, and $t_2$ is a propagation time until the ultrasonic wave reaches the ultrasonic element 3a when the ultrasonic wave is transmitted from the ultrasonic element 3b to the ultrasonic element 3a, then a flow speed V can be determined from the formula (1) described below, and a momentary value of the flow rate can be determined through a calculation such as multiplying the flow speed V by a cross-section area of the flow passage line 1. In addition, various efforts (e.g., taking a correlation of the ultrasonic waves, averaging a plurality of data, etc.) may be made to determine the propagation time with a satisfactory S/N ratio.

$$V = L\left(\frac{1}{t_1} - \frac{1}{t_2}\right) / 2\cos\theta \quad (1)$$

The ultrasonic wave transmission and receipt circuit is a circuit operable to transmit an ultrasonic wave transmission-instructing signal instructing a transmission of the ultrasonic wave to the ultrasonic elements 3a, 3b, and receive the ultrasonic signal received by the ultrasonic elements 3a, 3b, as well as transmit an ultrasonic wave transmission and receipt timing-informing signal informing a timing of transmission and receipt of the ultrasonic wave to the timing signal recording circuit, and transmit an ultrasonic wave transmission and receipt-indicative signal indicative of the transmission and receipt of the ultrasonic wave to the ultrasonic wave transmission and receipt signal recording circuit.

The ultrasonic wave transmission and receipt signal recording circuit is a circuit operable to record the ultrasonic wave transmission and receipt-indicative signal transmitted from the ultrasonic wave transmission and receipt circuit. In one example, a signal indicative of $t_1$, $t_2$ in the above formula (1) is transmitted from the ultrasonic wave transmission and receipt circuit and is recorded in the ultrasonic wave transmission and receipt signal recording circuit.

The timing signal recording circuit is a circuit operable to record the timing signal indicative of transmission and receipt timing of the ultrasonic wave. In one example, when the ultrasonic wave transmission and receipt timing-informing signal is received from the ultrasonic wave transmission and receipt circuit, the timing signal recording circuit generates and records the pulse waveform signal illustrated in FIG. 3 etc.

The flow rate calculation circuit is a circuit operable to receive the ultrasonic wave transmission and receipt-indicative signal from the ultrasonic wave transmission and receipt signal recording circuit, and calculate the signal to determine the flow rate. In one example, the flow rate calculation circuit receives the signal indicative of $t_1$, $t_2$ in the above formula (1) from the ultrasonic wave transmission and receipt signal recording circuit, determines a flow speed based on the above formula (1), and determines a momentary value of the flow rate through a calculation such as multiplying the flow speed by a cross-section area of the flow passage line 1.

The transmission and receipt timing calculation circuit is a circuit operable to determine the transmission and receipt timing of the ultrasonic wave based on the timing signal recorded in the timing signal recording circuit. In one example, the transmission and receipt timing calculation circuit receives the above pulse waveform signal from the timing signal recording circuit, and determines the transmission and receipt timing by, for example, applying a given corrective calculation to a value of clock time at which the pulse reaches a peak.

The pulsating fluctuation calculation circuit is a circuit operable, based on the respective flow rates determined by the flow rate calculation circuit and the respective transmission and receipt timings determined by the transmission and receipt timing calculation circuit, to compose the pulsating fluctuation of the flow rate. Specifically, the pulsating fluctuation calculation circuit determines a time-dependent fluctuation in the flow rate to compose the pulsating fluctuation by associating the respective transmission and receipt timings determined by the transmission and receipt timing calculation circuit with the respective flow rates determined by the flow rate calculation circuit.

Flow Rate Measurement Method According to the Present Invention

An example of the flow rate measurement method of the present invention that can be implemented using the flow rate measurement apparatus in FIG. 6 will be described below.

As already stated, pulsation is applied to the fluid within the flow passage line 1 by an actuator. The ultrasonic wave transmission and receipt circuit is a circuit operable to transmit the ultrasonic wave transmission-instructing signal to the ultrasonic elements 3a, 3b, as well as transmit the ultrasonic wave transmission and receipt timing-informing signal to the timing signal recording circuit. In response to the ultrasonic wave transmission-instructing signal, the ultrasonic wave is transmitted from the ultrasonic element 3a to the ultrasonic element 3b, and the ultrasonic wave received by the ultrasonic element 3b is transmitted to the ultrasonic wave transmission and receipt circuit. Further, the ultrasonic wave is transmitted from the ultrasonic element 3b to the ultrasonic element 3a, and the ultrasonic wave received by the ultrasonic element 3a is transmitted to the ultrasonic wave transmission and receipt circuit. The ultrasonic wave transmission and receipt circuit determines the times $t_1$, $t_2$ taken for the ultrasonic wave to be propagated in each direction between the ultrasonic elements 3a, 3b by, for example, using a clock time at which the ultrasonic wave transmission-instructing signal is transmitted to the ultrasonic elements 3a, 3b, and a clock time at which the ultrasonic signal is received from each of the ultrasonic elements 3a, 3b respectively (or by configuring such that the transmission and receipt clock times of the ultrasonic wave at each ultrasonic element 3a, 3b are sequentially transmitted to the ultrasonic wave transmission and receipt circuit and calculating the difference between the clock times), and transmits the signal indicative of the times $t_1$, $t_2$ to the ultrasonic wave transmission and receipt signal recording circuit. The signal indicative of the above $t_1$, $t_2$ is recorded in the ultrasonic wave transmission and receipt signal recording circuit. Further, the timing signal recording circuit generates and records the pulse waveform signal in response to the ultrasonic wave transmission and receipt timing-informing signal received from the ultrasonic wave transmission and receipt circuit. The above steps are repeated a predetermined number of times at given time intervals.

The flow rate calculation circuit receives the signals indicative of the above $t_2$, which correspond to respective ones of the above predetermined number of times of repetitive processing, from the ultrasonic wave transmission and receipt signal recording circuit, and determines momentary values of the flow rate using the above formula (1). The transmission and receipt timing calculation circuit receives the above pulse waveform signals, which correspond to respective ones of the above predetermined number of times of repetitive processing, from the timing signal recording circuit, and determines the transmission and receipt timings by, for example, applying a given corrective calculation to values of clock time at which the pulse reaches a peak. The pulsating fluctuation calculation circuit receives the respective flow rates determined by the flow rate calculation circuit and the respective transmission and receipt timings determined by the transmission and receipt timing calculation circuit, and associating them with each other to compose the pulsating fluctuation of the flow rate.

In this example, the $t_1$, $t_2$ are determined by the ultrasonic wave transmission and receipt circuit. Alternatively, determination of $t_1$, $t_2$ may be made by the flow rate calculation circuit. For example, when the clock times at which an ultrasonic signal is transmitted from the ultrasonic element 3a, the clock time at which this signal is received by the ultrasonic element 3b, the clock time at which an ultrasonic signal is transmitted from the ultrasonic element 3b, and the clock time at which this signal is received by the ultrasonic element 3a are recorded in the ultrasonic wave transmission and receipt signal recording circuit as signals indicative of transmission and receipt of the ultrasonic wave, then $t_1$, $t_2$ can be determined as differences between the clock times indicated by these signals. This applies to the second and third embodiments described below.

Second Embodiment

Figure 8:
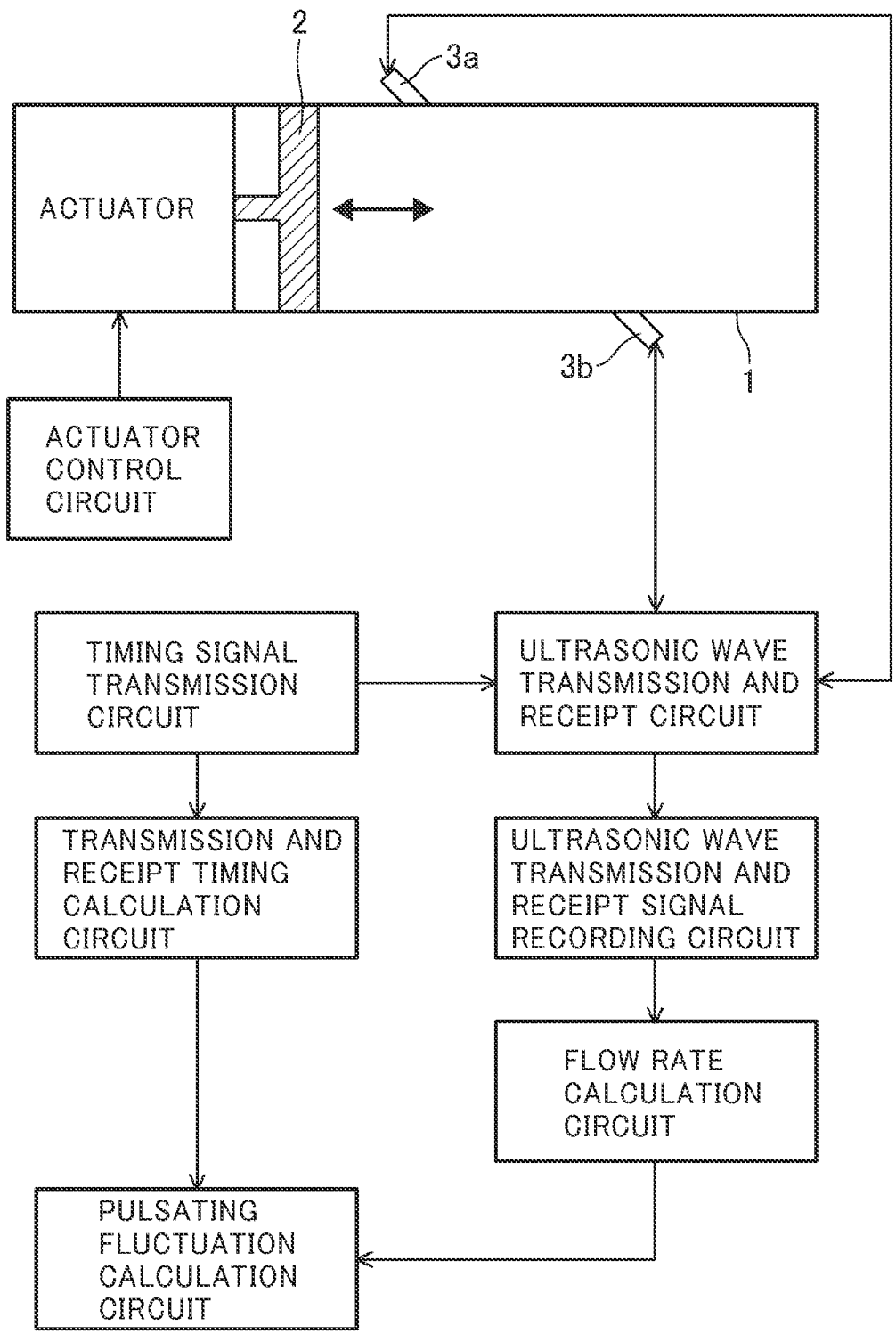
FIG. 8 is a structural diagram of a flow rate measurement apparatus different from the apparatus in FIG. 6, where the apparatus is connected to a flow passage, as a flow rate measurement apparatus according to one embodiment of the present invention.

Configuration of Flow Rate Measurement Apparatus According to the Present Invention Next, as another example of the flow rate measurement apparatus according to the present invention, an apparatus for measuring the flow rate in a manner of transmitting and receiving the ultrasonic signal in response to the timing signal, and recording the ultrasonic transmission and receipt-indicative signal is illustrated in FIG. 8.

In FIG. 8, the flow rate measurement apparatus comprises: a timing signal transmission circuit, ultrasonic elements 3a, 3b installed in a flow passage line 1 and an ultrasonic wave transmission and receipt circuit (which together constitute an ultrasonic wave transmitting and receiving section); an ultrasonic wave transmission and receipt signal recording circuit; a flow rate calculation circuit; a transmission and receipt timing calculation circuit; and a pulsating fluctuation calculation circuit. As with the configuration in FIG. 6, an actuator is connected to the flow passage line 1, where the actuator causes a piston 2 to perform, for example, a cyclic movement based on a pulsation reference signal transmitted from an actuator control circuit, whereby pulsation is applied to the fluid within the flow passage line 1. In the description below, any description of the same elements as those in the flow rate measurement apparatus as illustrated in FIG. 6 will be omitted.

The timing signal transmission circuit is a circuit operable to transmit the timing signal to the ultrasonic wave transmission and receipt circuit at a predetermined timing. In one example, the timing signal transmission circuit repeatedly generates pulse waveform signals at a predetermined frequency and transmits the signals to the ultrasonic wave transmission and receipt circuit.

In response to the timing signal transmitted from the timing signal transmission circuit, the ultrasonic wave transmission and receipt circuit transmits the ultrasonic wave transmission-instructing signal to the ultrasonic elements 3a, 3b, and receives the ultrasonic signals received by the ultrasonic elements 3a, 3b. Further, the ultrasonic wave transmission and receipt circuit transmits the ultrasonic transmission and receipt-indicative signal, such as a signal indicative of $t_1$, $t_2$ in the above formula (1), to the ultrasonic wave transmission and receipt signal recording circuit. This signal is recorded by the ultrasonic wave transmission and receipt signal recording circuit.

The flow rate calculation circuit, as with the flow rate calculation circuit in the configuration of FIG. 6, receives the ultrasonic wave transmission and receipt-indicative signal from the ultrasonic wave transmission and receipt signal recording circuit, and calculates the signal to determine the flow rate.

The transmission and receipt timing calculation circuit determines the transmission and receipt timing of the ultrasonic wave based on the preliminarily set timing signal transmitted from the timing signal transmission circuit. The specific way of determination of the flow rates and the transmission and receipt timings may be the same as the way performed in the configuration of FIG. 6. The operations of the pulsating fluctuation calculation circuit may also be the same as those in the configuration of FIG. 6.

Flow Rate Measurement Method According to the Present Invention

An example of the flow rate measurement method of the present invention that can be implemented using the flow rate measurement apparatus in FIG. 8 will be described below.

As already stated, pulsation is applied to the fluid within the flow passage line 1 by an actuator. The timing signal transmission circuit transmits the timing signal to the ultrasonic wave transmission and receipt circuit at a preliminarily set predetermined timing. In response, the ultrasonic wave transmission and receipt circuit transmits the ultrasonic wave transmission-instructing signal to the ultrasonic elements 3a, 3b. In response to the ultrasonic wave transmission-instructing signal, the ultrasonic wave is transmitted from the ultrasonic element 3a to the ultrasonic element 3b, and the ultrasonic wave received by the ultrasonic element 3b is transmitted to the ultrasonic wave transmission and receipt circuit. Further, the ultrasonic wave is transmitted from the ultrasonic element 3b to the ultrasonic element 3a, and the ultrasonic wave received by the ultrasonic element 3a is transmitted to the ultrasonic wave transmission and receipt circuit. The ultrasonic wave transmission and receipt circuit determines the times $t_1$, $t_2$ taken for the ultrasonic wave to be propagated in each direction between the ultrasonic elements 3a, 3b by, for example, using clock times at which the ultrasonic wave transmission-instructing signals are transmitted to the ultrasonic elements 3a, 3b, and clock times at which the ultrasonic signals are received from each of the ultrasonic elements 3a, 3b respectively, and transmits the signal indicative of the times $t_1$, $t_2$ to the ultrasonic wave transmission and receipt signal recording circuit. The signal indicative of the above $t_1$, $t_2$ is recorded in the ultrasonic wave transmission and receipt signal recording circuit. The above steps are repeated a predetermined number of times at given time intervals.

The flow rate calculation circuit receives the signals indicative of the above $t_1$, $t_2$, which correspond to respective ones of the above predetermined number of times of repetitive processing, from the ultrasonic wave transmission and receipt signal recording circuit, and determines momentary values of the flow rate using the above formula (1). The transmission and receipt timing calculation circuit receives the above timing signals from the timing signal transmission circuit, and determines the transmission and receipt timings by, for example, applying a given corrective calculation to a values of clock time at which the pulse reaches a peak. The pulsating fluctuation calculation circuit receives the respective flow rates determined by the flow rate calculation circuit and the respective transmission and receipt timings determined by the transmission and receipt timing calculation circuit, and associating them with each other to compose the pulsating fluctuation of the flow rate.

Third Embodiment

Figure 9:
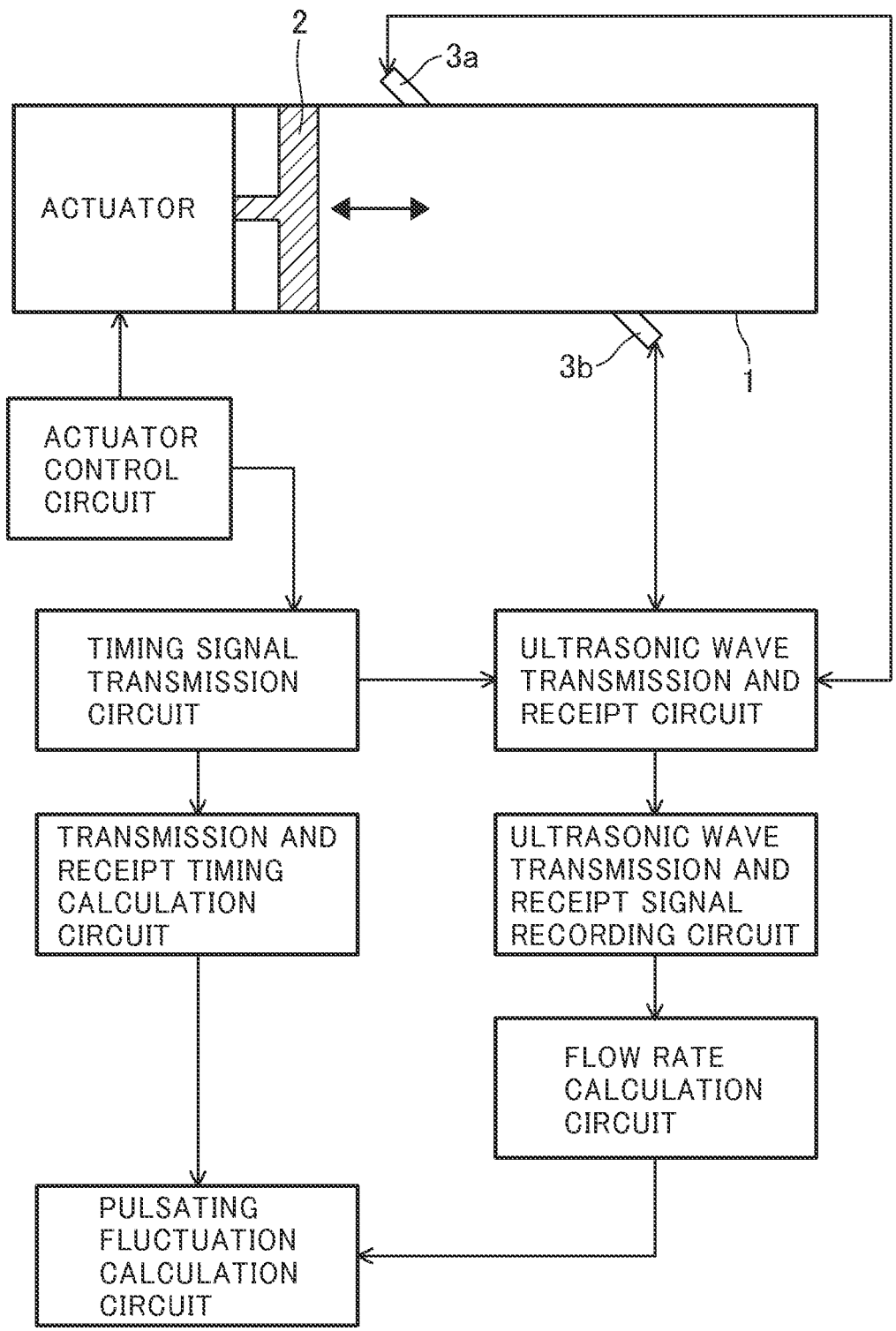
FIG. 9 is a diagram illustrating an aspect of connection for transmitting a timing signal at a frequency multiplied by a rational number of a frequency of the pulsation reference signal in the flow rate measurement apparatus illustrated in FIG. 8.

FIG. 9 illustrates an aspect of connection for transmitting a timing signal at a frequency obtained by multiplying a frequency of the pulsation reference signal by a rational number, as an alternative to the above configuration in FIG. 8. In addition to the configuration in FIG. 8, in this configuration, a pulsation reference signal (or any signal informing the frequency thereof) can be transmitted from the actuator control circuit to the timing signal transmission circuit. By configuring the timing signal transmission circuit to transmit the timing signals at a frequency obtained by multiplying a frequency of the pulsation reference signal by a rational number, it becomes possible, as already stated, to perform the discrete Fourier transform on the measured pulsating fluctuation.

Figure 10:
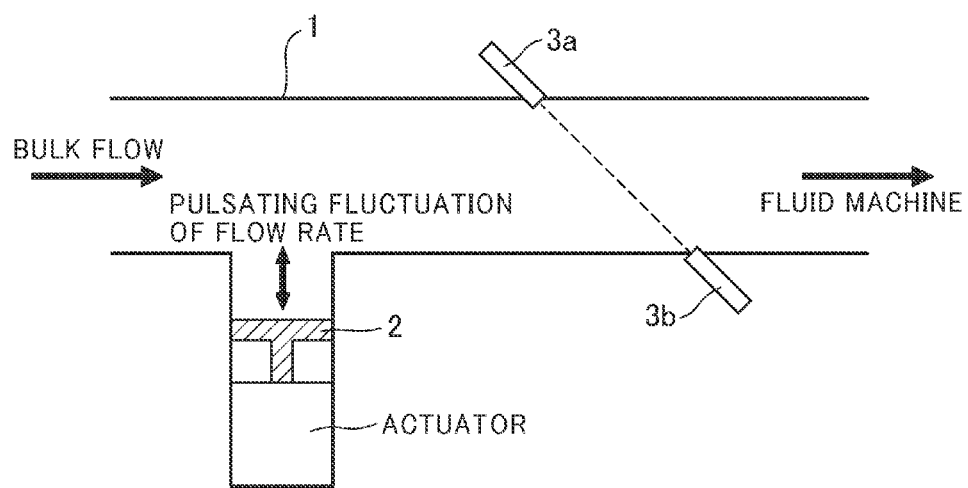
FIG. 10 is a diagram illustrating one example of another system capable of measuring a flow rate according to the flow rate measurement apparatus of the present invention.

In the above description, it is assumed, for simplicity, that the fluid only flows based on a pulsating fluctuation. Alternatively, as illustrated in FIG. 10, it is also possible to measure the pulsating fluctuation in the same manner according to the present invention in a system in which the pulsation is applied as a micro-disturbance with respect to a bulk flow according to a rated operation.

INDUSTRIAL APPLICABILITY

The measurement method and the measurement apparatus of the present invention is applicable to any system for measuring a pulsatingly fluctuating flow rate, such as a ground testing of a propellant pump for a liquid rocket engine. To discriminate the pump stability, it is important to have a phase difference between a flow rate and a pressure, and it is necessary to known a flow rate without a phase lag, so that it is particularly advantageous to use the measurement method and the measurement apparatus of the present invention. Measurement of pulsatingly fluctuating flow is in somewhat special demand as compared to measurement of steady flow, but in the development of a liquid rocket propulsion system, it is an essential technique for comprehending the stability of the system. Further, it is potentially utilized for acquisition of dynamic characteristics of various fluid equipments, etc.

EXPLANATION OF CODES

1: flow passage line
2: piston
3a, 3b: ultrasonic element

The invention claimed is:

1. A flow rate measurement method comprising at least one of:
   (a) repeating, a predetermined number of times, (1) a step of transmitting an ultrasonic wave into a fluid pulsatingly flowing through a flow passage, receiving the ultrasonic wave, and recording an ultrasonic wave transmission and receipt-indicative signal indicative of transmission and receipt of the ultrasonic wave, and (2) a step of recording a timing signal indicative of a timing at which the transmission and receipt of the ultrasonic wave have been performed, or
   (b) repeating, the predetermined number of times, (1) a step of transmitting a timing signal at a predetermined timing, and (2) a step of, in response to the transmitted timing signal, transmitting the ultrasonic wave into the fluid pulsatingly flowing through a flow passage, receiving the ultrasonic wave, and recording an ultrasonic wave transmission and receipt-indicative signal indicative of the transmission and receipt of the ultrasonic wave;
   and the method further comprising:
   determining flow rates corresponding to at least part of the ultrasonic wave transmission and receipt-indicative signals based on the at least part of the recorded ultrasonic wave transmission and receipt-indicative signals;
   determining ultrasonic wave transmission and receipt timings corresponding to at least part of the timing signals based on the at least part of the timing signals; and
   composing a pulsating fluctuation in flow rate of the fluid based on the determined respective flow rates and the determined respective transmission and receipt timings.

2. The method as defined in claim 1, wherein the fluid is a fluid flowing through the flow passage while pulsatingly fluctuating based on a pulsation reference signal, and the step of transmitting the timing signal at the predetermined timing further comprises:
   transmitting the timing signal at a frequency obtained by multiplying a frequency of the pulsation reference signal by a rational number.

3. The method of claim 2, further comprising:
determining discrete Fourier coefficients corresponding to the frequency.

4. The method of claim 1 further comprising:
determining an amplitude and phase of each of the respective flow rates with respect to a pulsation frequency.

5. A flow rate measurement apparatus, comprising at least one of:
(a) an ultrasonic wave transmitting and receiving section for transmitting ultrasonic waves into a fluid pulsatingly flowing through a flow passage, and receiving the ultrasonic waves, an ultrasonic wave transmission and receipt signal recording section for recording ultrasonic wave transmission and receipt-indicative signals indicative of the transmissions and receipts of the ultrasonic waves, and a timing signal recording section for recording timing signals indicative of timings at which the transmissions and receipts of the ultrasonic waves have been performed, or
(b) a timing signal transmitting section for transmitting timing signals at predetermined timings, the ultrasonic wave transmitting and receiving section for transmitting ultrasonic waves into a fluid pulsatingly flowing through a flow passage and receiving the ultrasonic waves in response to the transmitted timing signals, and the ultrasonic wave transmission and receipt signal recording section for recording ultrasonic wave transmission and receipt-indicative signals indicative of the transmissions and receipts of the ultrasonic waves;
and the apparatus further comprising:
a flow rate determining section for determining flow rates based on the ultrasonic wave transmission and receipt-indicative signals;
an ultrasonic wave transmission and receipt timing determining section for determining ultrasonic wave transmission and receipt timings based on the timing signals; and
a pulsating fluctuation composing section for composing a pulsating fluctuation of flow rate of the fluid based on the respective flow rates determined by the flow rate determining section and the respective transmission and receipt timings determined by the ultrasonic wave transmission and receipt timing determining section, wherein:
when the apparatus comprises the timing signal recording section: the transmission and receipt performed by the ultrasonic wave transmitting and receiving section, the recording of the ultrasonic wave transmission and receipt-indicative signal performed by the ultrasonic wave transmission and receipt signal recording section, and the recording of the timing signal performed by the timing signal recording section are repeated a predetermined number of times;
when the apparatus comprises the timing signal transmitting section: the transmission of the timing signal performed by the timing signal transmitting section, the transmission and receipt of the ultrasonic wave performed by the ultrasonic wave transmitting and receiving section in response to the transmitted timing signal, and the recording of the ultrasonic wave transmission and receipt-indicative signal performed by the ultrasonic wave transmission and receipt signal recording section are repeated a predetermined number of times;
the flow rate determining section is operable, based on at least part of the recorded ultrasonic wave transmission and receipt-indicative signals, to determine flow rates corresponding to the at least part of the ultrasonic wave transmission and receipt-indicative signals;
the ultrasonic wave transmission and receipt timing determining section is operable, based on at least part of the timing signals, to determine ultrasonic wave transmission and receipt timings corresponding to the at least part of the timing signals; and
the pulsating fluctuation composing section is operable, based on the determined respective flow rates and the determined respective transmission and receipt timings, to compose a pulsating fluctuation of flow rate of the fluid.

6. The apparatus as defined in claim 5, wherein the fluid is a fluid flowing through the flow passage while pulsatingly fluctuating based on a pulsation reference signal, and the timing signal transmitting section is further operable to transmit the timing signal at a frequency obtained by multiplying a frequency of the pulsation reference signal by a rational number.

7. The apparatus of claim 5, wherein the ultrasonic wave transmission and receipt-indicative signals indicative of the transmissions and receipts of the ultrasonic waves comprise waveforms of transmitted/received ultrasonic waves.

8. An apparatus comprising:
a timing signal transmitting circuit configured to transmit timing signals at predetermined timings;
an ultrasonic wave transmitting and receiving circuit configured to transmit ultrasonic waves into a fluid pulsatingly flowing through a flow passage and receive the ultrasonic waves in response to the transmitted timing signals;
an ultrasonic wave transmission and receipt signal recording circuit configured to record ultrasonic wave transmission and receipt-indicative signals indicative of the transmissions and receipts of the ultrasonic waves;
a flow rate determining circuit configured to determine flow rates corresponding to at least part of the ultrasonic wave transmission and receipt-indicative signals and based on the at least part of the recorded ultrasonic wave transmission and receipt-indicative signals;
an ultrasonic wave transmission and receipt timing determining circuit configured to determine ultrasonic wave transmission and receipt timings based on the timing signals; and
a pulsating fluctuation composing circuit configured to compose a pulsating fluctuation of flow rate of the fluid based on the respective flow rates determined by the flow rate determining circuit and the respective transmission and receipt timings determined by the ultrasonic wave transmission and receipt timing determining circuit,
wherein the transmission of the timing signal performed by the timing signal transmitting circuit, the transmission and receipt of the ultrasonic wave performed by the ultrasonic wave transmitting and receiving circuit in response to the transmitted timing signal, and the recording of the ultrasonic wave transmission and receipt-indicative signal performed by the ultrasonic wave transmission and receipt signal recording circuit are repeated a predetermined number of times.

9. The apparatus of claim 8, wherein the fluid comprises a fluid flowing through the flow passage while pulsatingly fluctuating based on a pulsation reference signal, and the timing signal transmitting circuit is further configured to:
  transmit the timing signal at a frequency obtained by multiplying a frequency of the pulsation reference signal by a rational number.

\* \* \* \* \*